July 22, 1969  G. I. COHN  3,457,502
HIGHLY-STABLE ORTHOGONAL ELECTRIC COIL CONFIGURATION
Filed April 25, 1967

INVENTOR.
GEORGE I. COHN
BY
Christie Parker Hale
ATTORNEYS.

United States Patent Office 3,457,502
Patented July 22, 1969

3,457,502
HIGHLY-STABLE ORTHOGONAL ELECTRIC COIL CONFIGURATION
George I. Cohn, Pasadena, Calif., assignor to Quantum Engineering, Inc., Pasadena, Calif., a corporation of California
Filed Apr. 25, 1967, Ser. No. 633,504
Int. Cl. G01r 33/12; G01v 3/10
U.S. Cl. 324—34   1 Claim

ABSTRACT OF THE DISCLOSURE

A plurality of electric coils are placed in mutually orthogonal relationship such that their deformation is interdependent. Preferably, the coils overlap one another in part, are wrapped around a mass of material, and are bonded to the surface of the mass. Special advantage may be derived with a mass in the form of a parallelepiped having mutually perpendicular adjoining sides. An auxiliary coil is connected in circuit with one of the coils and is oriented to cancel the mutual magnetic coupling existing between the two main coils.

Background of the invention

This invention relates to electric coils in orthogonal relationship to one another and, more particularly, to a coil configuration that maintains a high degree of magnetic decoupling between orthogonal coils.

Numerous electronic instruments call for the use of electric coils oriented in orthogonal relationship to one another. Ideally, no magnetic coupling exists between coils that are so arranged. It is this property that is utilized in one way or another in most applications of orthogonal coils. Complete magnetic decoupling is, however, impossible to achieve in practice. In general, the performance of the instrument employing orthogonal coils is directly related to the degree with which magnetic decoupling of the coils is in fact achieved.

One application of orthogonal coils is in metallic and magnetic object detectors, for example, devices that detect explosive mines, hidden treasure, underground pipes, etc. In an object detector, an alternating electric current is applied to one coil which causes small magnetization and/or currents to flow in the object to be detected. These small currents and/or magnetization produce a magnetic field that induces a very small voltage in the other coil. The sensitivity and effective range of such an object detector depends upon the degree of magnetic decoupling between the two coils.

The problem of attaining a high degree of magnetic decoupling between orthogonal coils has two aspects, establishing a desired degree of decoupling between coils initially and maintaining the desired degree of decoupling once it is established. After the coils are set up, they are subject to mechanical deformation caused by, among other things, temperature changes. These deformation affect the magnetic coupling between coils. In an attempt to stabilize the established degree of magnetic decoupling, resort is commonly made to elaborate supporting structures designed to lend the necessary structural rigidity to the coils. These supporting structures add substantially to the size and weight of the resultant coil configuration. Often they surround the coils so it is desirable to wind the turns of the coils as closely together as possible to conserve space and weight. Further, such structures do not stabilize coils effectively for magnetic decoupling below about 0.1 to 0.001 percent.

Summary of the invention

According to one aspect of the invention, a plurality of orthogonal coils are mechanically coupled together so the deformation of the coils is interdependent. The deformation of one coil compensates for the deformation of the other and the established degree of magnetic decoupling is maintained with high stability.

Preferably, the coils each have a quadrangular cross section and are mechanically coupled together by wrapping them around a mass of material. The coils are bonded to the mass so each coil conforms to the surface of the mass. Consequently, each coil becomes deformed responsive to deformation of the mass.

Most advantageously, the coils are crossed so one coil overlaps the other. The axial height of each coil approximately equals the width of the other coil on the sides where the coils cross. Such an arrangement is conductive to a loosely wound coil configuration, thereby permitting a reduction in power dissipation and inductance in the coils for a given specific magnetic moment. Further, the mass is preferably a parallelepiped having mutually perpendicular adjoining sides. Consequently, all the turns of a coil enclose the same cross sectional area without having to wind the turns compactly.

Another aspect of the invention is the establishment of first and second orthogonal coils initially with a high degree of magnetic decoupling. Responsive to the current flowing in the first coil, a magnetic flux is produced that cancels the magnetic flux coupled from the first coil to the second coil. Specifically, an auxiliary coil is connected in circuit with the first coil and is oriented so the flux linkages produced between the auxiliary coil and the second coil responsive to a given current flow through the first coil cancel the flux linkages produced between the first and second coils responsive to the given current flow through the first coil.

Brief description of the drawing

The features of specific embodiments of the invention are illustrated in the drawing, in which.

Description of specific embodiments

Figure 1:
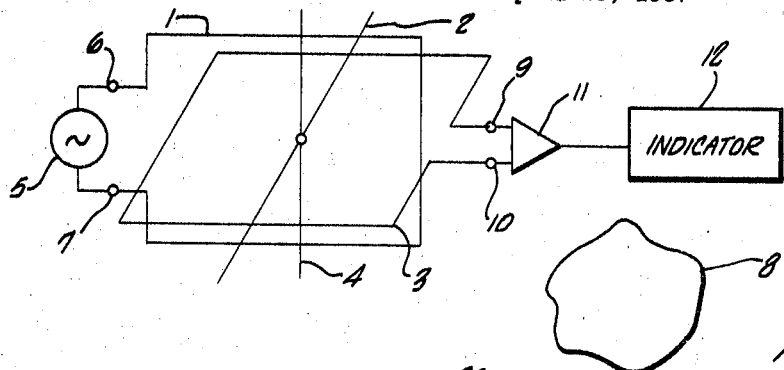
FIG. 1 is a schematic diagram of an object detecting system.

In FIG. 1, an object detecting system is shown, which includes an electric coil 1 having an axis 2 and an electric coil 3 having an axis 4. Although coils 1 and 3 are represented and a single turn of a conductor, they would in practice have many turns. Axes 2 and 4 are in orthogonal relationship to one another for the purpose of magnetic decoupling between coils 1 and 3. A source 5 of alternating current is connected across terminals 6 and 7 of coil 1, thereby establishing an alternating magnetic field in its vicinity. This magnetic field establishes a magnetization in nearby ferromagnetic bodies and/or current flow in nearby conductive bodies, such as a body designated 8. This magnetization and/or current flow, which may be in the nature of eddy currents, produces in turn a small magnetic field that is sensed by coil 3. Terminals 9 and 10 of coil 3 are connected to the input of an amplifier 11 having a frequency response with a pass band that selectively transmits the frequency of source 5. An indicator 12 senses the output of amplifier 11. To the extent that direct magnetic coupling takes place between coils 1 and 3, the sensitivity and range of the system in detecting metal objects is reduced. Therefore, it is desirable to establish and maintain coils 1 and 3 in an orthogonal relationship with a high degree of magnetic decoupling therebetween.

Figure 2:
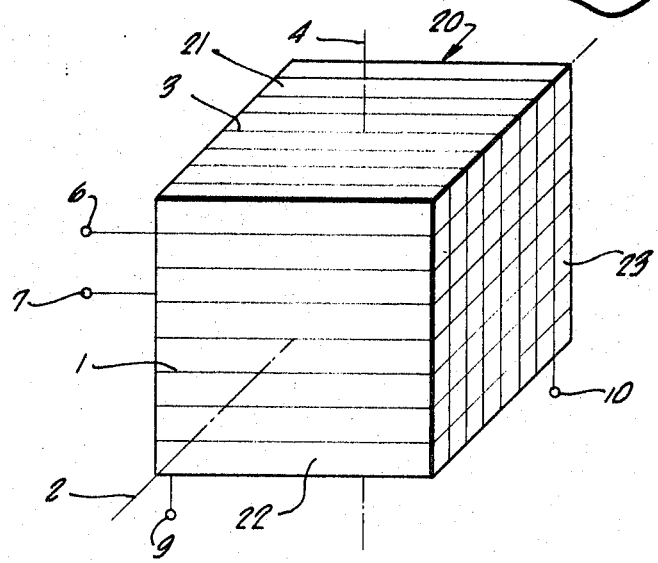
FIG. 2 is a perspective view of an electric coil configuration incorporating the principles of the invention.

In FIG. 2, a mass 20 of material is shown. Mass 20, which has a surface with six sides, forms a cube. A top side 21, a front side 22, and a right side 23 are visible in FIG. 2. The other three sides, namely a bottom side, a back side, and a left side are not visible. Coil 1 of FIG. 1 is wrapped around the front, right, rear, and left sides of mass 20. Similarly, coil 3 of FIG. 1 is wrapped around the right, top, left, and bottom sides of mass 20. When the configuration is constructed in this fashion, coils 1 and 3 are orthogonal and cross on the right and left sides of mass 20. They should therefore be formed from insulated conductors. As illustrated in FIG. 2, coils 1 and 3 have axial heights and widths that are approximately equal to each other, since mass 20 is a cube. Coils 1 and 3 are bonded or cemented to the surface of mass 20, so they conform completely thereto.

As a result of the construction of FIG. 2, coils 1 and 3 are mechanically coupled together by mass 20. They are therefore deformed responsive to deformations of mass 20, due for example to temperature gradients in it. The deformations of coils 1 and 3, conforming to the surface of mass 20, are made interdependent such that the deformation of one coil compensates for the deformation of the other coil and high stability of the established magnetic decoupling between coils is maintained. In other words, when one coil is deformed, the other coil is also forced to deform in a related manner that tends to oppose a change in the degree of magnetic decoupling.

Although it is preferable mechanically to couple the coils together by wrapping them around mass 20 as shown in FIG. 2, sufficient mechanical coupling for some purposes can also be achieved without mass 20. In such case, the coils are directly attached to one another by a bonding material or the like. If the coils cross as shown in FIG. 2, they are attached together in the region in which they cross by a bonding material extending between the coils. Such a configuration, however, does not provide as extensive mechanical coupling, and hence as high stability, as mass 20 permits.

Mass 20 could be made of either a ferromagnetic material or a nonferromagnetic material. In many cases, it would be desirable to utilize a nonferromagnetic material having a very low temperature coefficient of expansion such as fused quartz, which would improve the stability even further.

It is not essential that the coils cross as shown in FIG. 2. Arranging the coils in a crossed relationship, however, results in a particularly compact and light-weight configuration. A crossed-coil relationship is also conducive to a loosely wound, i.e., spread out, coil configuration, which results in small inductance and power dissipation for a given specific magnetic moment. Since the turns of one coil occupy a certain cross sectional area in any event, this entire area is available for the length of the other coil.

A cube or other parallelepiped with mutually perpendicular adjoining sides is particularly advantageous because the turns of the coils can be wrapped around mass 20 so each turn encloses the same cross sectional area without having to concentrate the turns over a small area of mass 20. It is possible, however, to employ a mass of other shapes, for example, a sphere, a solid oval, or an irregularly shaped body if this advantage is not to be utilized.

Figure 3:
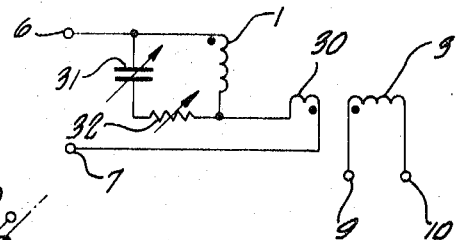
FIG. 3 is a schematic circuit diagram of a coil arrangement to be used with the configuration of FIG. 2.

FIG. 3 depicts an arrangement for initially establishing coils 1 and 3 so they possess a high degree of magnetic decoupling. When the coil configuration of FIG. 2 is constructed, there is some small magnetic coupling between coils 1 and 3, regardless of how carefully the configuration is constructed. This results from the inherent tolerances involved. To counteract this, an auxiliary coil 30 is connected in series circuit with coil 1 and wound around the same four sides of mass 20 as coil 3 so its axis is coincident with axis 4. By means of a variable capacitor 31 and a variable resistor 32, the phase and amplitude of the current through coil 30 is adjusted so the flux linkages produced between coil 30 and coil 3 responsive to a given current flow through coil 1 precisely cancel the flux linkages produced between coil 1 and coil 3 responsive to the given current flow through coil 1. The polarity dots associated with coils 1, 3, and 30 represent this relationship.

In summary, the arrangement of FIG. 3 enables a high degree of magnetic decoupling between orthogonal coils to be initially established, and the arrangement of FIG. 2 enables this degree of magnetic decoupling to be maintained with high stability.

As alternatives to the arrangement of FIG. 3, auxiliary coil 30 could be connected in parallel with coil 1, or inductively coupled to coil 1 as well as coil 3, or a precisely oriented slug of conducting material and/or magnetic material could be substituted for coil 30. In any case, magnetic flux is produced responsive directly or indirectly to the current flowing through coil 1 that cancels the flux directly coupled between coils 1 and 3.

Figure 4:
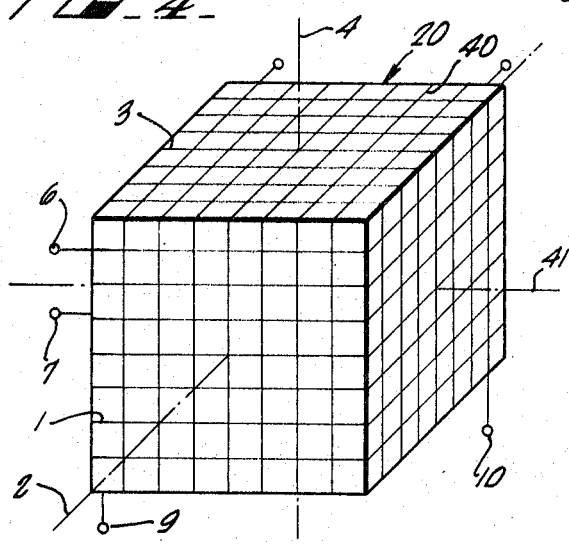
FIG. 4 is a perspective view of another coil configuration incorporating the principles of the invention.

A coil arrangement is shown in FIG. 4 involving three mutually orthogonal coils. In addition to coils 1 and 3, shown in FIG. 2, a coil 40 is shown having an axis 41. Coil 40 is wrapped around the top, front, bottom, and back sides of mass 20. In the arrangement of FIG. 4, two coils cross on each side of mass 20. In similar fashion to the arrangement of FIG. 2, the deformation of coils 1, 3, and 40 are all interdependent, deformation of each coil compensating for the deformation of the other coils so high stability is possible.

The term "coils in orthogonal relationship" as used in this specification means that the coils are arranged so substantially no mutual magnetic coupling exists between them. When the coils are wrapped around a cubical mass, the axes of the coils are also perpendicular. In other coil configurations, the axes of the coils may possibly be nonperpendicular.

What is claimed is:
1. An electric coil configuration comprising:
a first electric coil having a quadrangular cross section;
a second electric coil having a quadrangular corss section;
the first and second coils being arranged substantially in orthogonal relationship to each other such that they cross each other on two sides;
the axial height of each coil approximately equaling the width of the other coil on the sides where the coils cross;
a mass of material lying within the volume defined by the coils, the mass of material being bonded to the first and second coils to couple them mechanically together such that their deformation is interdependent, the deformation of one coil compensating for deformation of the other coil; and
means responsive to the current flowing through the first coil for generating a magnetic flux that cancels the magnetic flux coupled between the first and second coils, the magnetic flux generating means com- prising an auxiliary coil connected in circuit with the first coil, oriented approximately in orthogonal relationship with the first coil, and bonded to the mass of material.

References Cited

UNITED STATES PATENTS

| | | | |
|---|---|---|---|
| 2,223,737 | 12/1940 | Moses | 336—205 |
| 3,237,136 | 2/1966 | Ford | 336—205 |
| 1,971,549 | 8/1934 | Woodward. | |
| 2,451,596 | 10/1948 | Wheeler | 340—196 |
| 2,547,407 | 4/1951 | Nelson | 324—3 |
| 3,061,775 | 10/1962 | Reznowski | 324—41 |
| 3,354,385 | 11/1967 | Wood et al. | 324—37 |

FOREIGN PATENTS

| | | |
|---|---|---|
| 574,808 | 1/1946 | Great Britain. |
| 729,706 | 5/1955 | Great Britain. |

RUDOLPH V. ROLINEC, Primary Examiner
R. J. CORCORAN, Assistant Examiner

U.S. Cl. X.R.

324—3, 41; 340—38; 336—205

UNITED STATES PATENT OFFICE

CERTIFICATE OF CORRECTION

Patent No. 3,457,502 July 22, 1969

George I. Cohn

It is certified that error appears in the above identified patent and that said Letters Patent are hereby corrected as shown below:

Column 1, line 58, "deformation" should read -- deformations --. Column 2, line 61, "and" should read -- as --. Column 3, line 66, "conductive" should read -- conducive --. Column 4, line 57, "corss" should read -- cross --.

Signed and sealed this 2nd day of June 1970.

(SEAL)
Attest:

Edward M. Fletcher, Jr.
Attesting Officer

WILLIAM E. SCHUYLER, JR.
Commissioner of Patents